United States Patent [19]

Kuroda et al.

[11] Patent Number: 4,507,448
[45] Date of Patent: Mar. 26, 1985

[54] PROCESS FOR THE PRODUCTION OF POLYOLEFINS

[75] Inventors: Nobuyuki Kuroda, Yokohama; Toru Nakamura, Kawasaki; Yutaka Shikatani, Yokohama; Kazuo Matsuura, Tokyo; Mitsuji Miyoshi, Fujisawa, all of Japan

[73] Assignee: Nippon Oil Co., Ltd., Tokyo, Japan

[21] Appl. No.: 374,627

[22] Filed: May 4, 1982

Related U.S. Application Data

[63] Continuation of Ser. No. 217,755, Dec. 18, 1980, abandoned.

[30] Foreign Application Priority Data

Dec. 28, 1979 [JP]  Japan ................................ 54-173448

[51] Int. Cl.³ .......................... C08F 4/02; C08F 10/00
[52] U.S. Cl. .................................... 526/125; 502/125; 502/119; 526/128; 526/348.6; 526/352; 526/901; 526/906
[58] Field of Search ........................................ 526/125

[56] References Cited

U.S. PATENT DOCUMENTS 4,172,050 10/1979 Gessell ................................ 526/151
4,209,602 6/1980 Kuroda et al. ...................... 526/125

FOREIGN PATENT DOCUMENTS 2324766 1/1974 Fed. Rep. of Germany ...... 526/125
2600593 7/1976 Fed. Rep. of Germany ...... 526/125

*Primary Examiner*—Edward J. Smith
*Attorney, Agent, or Firm*—Robert E. Burns; Emmanuel J. Lobato; Bruce L. Adams

[57] ABSTRACT

A process for the homopolymerization or copolymerization of olefins is disclosed, which is carried out in the presence of a catalyst system comprising the combination of at least one organometallic compound with a component resulting from the reaction of (a) a magnesium halide, (b) a compound represented by the formula, $Al(OR)_nX_{3-n}$, where R is a hydrocarbon residual group having 1 to 20 carbon atoms, X is a hydrogen atom, and n is $0 \leq n \leq 3$, (c) a compound represented by the formula, $Si(OR')_mX_{4-m}$, where R' is a hydrocarbon residual group having 1 to 20 carbon atoms, X is a halogen atom, and m is $0 \leq m \leq 4$, and (d) a titanium compound and/or a vanadium compound. The resulting polymers have a large bulk density and a narrow range of molecular weight distribution.

19 Claims, No Drawings

PROCESS FOR THE PRODUCTION OF POLYOLEFINS

This is a continuation of application Ser. No. 217,755, filed 12-18-80, now abandoned.

BACKGROUND OF THE INVENTION

1. Field of the Invention

This invention relates to a process for the production of polyolefins employing novel catalysts.

2. Prior Art

Catalysts for the production of polyolefins have been known which include a transition metal compound such as a titanium compound and a vanadium compound carried on a magnesium halide, and an organometallic compound as disclosed, for example, in Japanese Patent Publication No. 39-12105. Another similar catalyst is described in Belgian Pat. No. 742,112 and includes titanium tetrachloride carried on a magnesium halide anhydride which has been activated by a ball mill. Neither of such prior art has still much to be desired in respect of the catalytic activity.

German Pat. No. 2137872 is directed to the copulverization of magnesium halide, titanium tetrachloride and alumina whereby the consumption of magnesium halide is minimized. This process however has not achieved any substantial increase in the per solid polymerization activity.

It is known that the bulk density of a given polymer is also an important factor having regard to the yields as well as to the slurry handling.

SUMMARY OF THE INVENTION

The present invention provides a process for the homopolymerization or copolymerization of olefins using an improved catalyst which will achieve higher polymerization activity and greater bulk density of the resulting polymer as compared to the prior art teachings. The invention is further directed to the preparation of such improved catalyst which permits using reduced monomer partial pressures with minimum catalyst residues in the resulting polymer, whereby the step of removing the catalyst residue in the polymer can be dispensed with and the polymer handling procedures simplified, contributing to an economical polyolefins production.

Another advantage of the process of the invention is that the bulk density of the polymer being greater, there is obtained greater yield of polymer per unit solvent.

A further advantage of the invention resides in that despite the increased bulk density, the resulting polymer contains a relatively small proportion of objectionably coarse particles and minute particles of less than 50 microns. This makes it feasible to carry out the polymerization reaction in a continuous fashion and also facilitates centrifugal separation of polymer particles as well as the transport or otherwise handling of the polymer.

A still further advantage of the invention is that a polyolefin such as for example polyethylene which may be obtained according to the inventive process has a large bulk density such that less hydrogen concentrations are required to obtain an intended melt index and hence the total polymerization pressures can be held to a minimum.

Another, yet important advantage of the invention is that the polymer has a very narrow range of molecular weight distribution such that low molecular weight components in an organic solvent such as hexane may be minimized, making it possible to apply the polymer most suitably to films for wrapping the foods and also to eliminate fuming in the molding process.

Still another advantage of the invention is that the rate of diminision with time of ethylene for example being absorbed by the catalyst is considerably reduced so that a relatively prolonged polymerization reaction can be achieved with a relatively small amount of catalyst.

Briefly stated, the foregoing advantages of the invention accrue from the provision of an improved catalyst comprising a solid catalyst component and an organometal compound, said solid catalyst component being obtained by reaction of: (a) a magnesium halide, (b) a compound represented by the formula: $Al(OR)_nX_{3-n}$ where R is a hydrocarbon residual group having 1-20 carbon atoms, preferably an alkyl group of 1-4 carbon atoms, X is a halogen atom and n is $0<n\leq 3$, and (c) a compound represented by the formula: $Si(OR')_mX_{4-m}$ where R' is a hydrocarbon residual group having 1-20 carbon atoms, X is a halogen atom, and m is $0\leq m\leq 4$, and (d) a titanium compound and/or a vanadium compound.

DESCRIPTION OF THE PREFERRED EMBODIMENTS

The magnesium halide which is substantially anhydrous in the practice of the invention includes magnesium fluoride, magnesium chloride, magnesium bromide, magnesium iodide and mixtures thereof.

The compound of the formula $Al(OR)_nX_{3-n}$ includes aluminum trimethoxide, aluminum triethoxide, diethoxymonochloroaluminum, monoethoxydichloroaluminum, monomethoxydiethoxyaluminum, aluminum tri-n-propoxide, aluminum triisopropoxide, diisopropoxymonochloroaluminum, monoisopropoxydichloroaluminum, monomethoxydiisopropoxyaluminum, aluminum tri-n-butoxide, aluminum tri-sec-butoxide and aluminum tri-t-butoxide, amongst which aluminum trimethoxide and aluminum triethoxide are most preferred.

The compound of the formula $Si(OR')_mX_{4-m}$ includes silicon tetrachloride, monomethoxytrichlorosilane, monoethoxytrichlorosilane, monoisopropoxytrichlorosilane, mono-n-butoxytrichlorosilane, monopentoxytrichlorosilane, monooctoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane, and tetraisopropoxysilane.

The titanium and/or vanadium compound includes halides, alkoxyhalides, alkoxides and halogen oxides of titanium and/or vanadium. Trivalent and tetravalent titanium compounds are preferred as the titanium compound used in accordance with the invention.

The tetravalent titanium compound may be represented by the formula $Ti(OR)_nX_{4-n}$ (where R is an alkyl, aryl or aralkyl group of 1-20 carbon atoms, X is a halogen atom, and n is $0\leq n\leq 4$.), typical examples of which include titanium tetrachloride, titanium tetrabromide, titanium tetraiodide, monomethoxytrichlorotitanium, dimethoxydichlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, and tetraphenoxytitanium.

Typical examples of such trivalent titanium compound are a titanium trihalide resulting from reducing titanium tetrahalide such as titanium tetrachloride with hydrogen, aluminum, titanium or an organometal compound of a metal of Groups I–III of the Periodic Table, and a trivalent titanium compound resulting from reducing a titanium alkoxyhalide of the formula Ti$(OR)_mX_{4-m}$ (where R is an alkyl, aryl or aralkyl group of 1–20 carbon atoms, X is a halogen atom, and m is $0 < m < 4$.) with an organometal compound of a metal of Groups I–III of the Periodic Table.

The vanadium compound includes a trivalent vanadium compound such as vanadium trichloride and vanadium triethoxide, a tetravalent vanadium compound such as vanadium tetrachloride, vanadium tetrabromide, vanadium tetraiodide, and tetraethoxyvanadium, and a pentavalent vanadium compound such as oxytrichlorovanadium, ethoxydichlorovanadyl, triethoxyvanadyl and tributoxyvanadyl.

To obtain a more effective result according to the invention, both titanium and vanadium compounds may be used in combination, in which instance the mole ratio of vanadium/titanium is preferably in the range of 2/1–0.01/1.

The organometal compound contemplated by the present invention may be those of metals belonging to the Group I to IV metals in the Periodic Table which are known as one component of the Ziegler catalyst and preferably includes organoaluminum compounds and organozinc compounds. Examples of these organometal compounds are organoaluminum compounds represented by the general formula $R_3Al$, $R_2AlX$, $RAlX_2$, $R_2AlOR$, $RAl(OR)X$, and $R_3Al_2X_3$ (where R is an alkyl group or aryl group of 1 to 20 carbon atoms, which may be the same or different; and X is a halogen atom), and organozinc compounds represented by the general formula $R_2Z_n$ (where R is an alkyl group of 1 to 20 carbon atoms, which may be either identical or different). Typical examples of these compounds include triethylaluminum, triisobutylaluminum, trihexylaluminum, trioctylaluminum, diethylaluminumchloride, ethylaluminumsesquichloride, diethylzinc and mixtures thereof. The organometal compounds may usually be used in amounts of from 0.1 to 1,000 mols with respect to the transition metal compound.

There is no restriction imposed upon the method of reacting the components (a) a magnesium halide, (b) a compound of the formula $Al(OR)_nX_{3-n}$, (c) a compound of the formula $Si(OR')_mX_{4-m}$ and (d) a titanium compound and/or a vanadium compound. The components (a), (b) and (c) may be copulverized and then contacted with the component (d) under heat conditions either in the presence or absence of inert solvents, but preferably in the absence of such solvents, at temperatures ranging between 50° and 300° C., preferably 100° and 150° C. Time length for the reaction is not particularly critical and may usually, needless to mention, be carried out in an inert gas atmosphere free of oxygen and moisture.

Unreacted transition metal compounds may be removed for instance with use of solvents inert to Ziegler catalysts, which solvents may be evaporated in vacuum in the usual manner so as to obtain solid catalyst component.

It is preferable however according to the invention to copulverize the components (a), (b), (c) and (d), the order of the copulverization thereof being optional.

The copulverization should of course be conducted in an inert gas atmosphere with minimum moisture.

It has now been found that the mol ratio of (a) magnesium halide to (b) compound of the formula $Al(OR)_nX_{3-n}$ in terms of Mg/Al is in the range of 1/0.01–1/1, preferably 1/0.05–1/0.5. Amounts of the aluminum compound departing from these ranges would result in reduced polymerization activity.

The compound (c) of the formula $Si(OR')_mX_{4-m}$ should be used in amounts of usually 0.1–50 grams, preferably 0.5–10 grams per 100 grams of the magnesium halide (a).

The titanium and/or vanadium compound should be used in such an amount that the resulting solid catalyst component contains 0.5–10, or preferably 1–8 percent by weight of titanium and/or vanadium so as to obtain a well balanced activity per titanium and/or vanadium and per solid catalyst.

Apparatus for effecting copulverization may be a ball mill, vibration mill, rod mill, impact mill or the like. Temperature, time and other operating conditions may be determined by those skilled in the art depending upon the particular apparatus employed. The temperature usually ranges from 0° C. to 200° C., or preferably from 20° C. to 100° C., and the time from 0.5 to 50 hours, or preferably from 1 to 30 hours.

The polymerization of olefins according to the invention is carried out in very much the same way as it is done in the presence of Ziegler catalysts where the reaction takes place in a slurried or vapor phase condition in the presence or absence of an inert hydrocarbon atmosphere substantially free of oxygen and water. It is carried out at a temperature of 20° to 120° C., preferably 50° to 100° C. and at a pressure of atmospheric to 70 kg/cm$^2$, preferably 2 to 60 kg/cm$^2$. Molecular weights of the resulting polymer may be regulated to some extent by varying the polymerization temperature as well as the quantities of catalysts but can be more effectively regulated by the addition of hydrogen in the polymerization system. It is possible to effect the polymerization reaction in two or more multi-stages involving different hydrogen concentrations, temperatures and other polymerization conditions.

The process of the invention may be applied to all olefins polymerizable with use of Ziegler catalysts and more specifically to the homopolymerization of alpha-olefins of 2–12 carbon atoms such as ethylene, propylene, and 1-butene and to the copolymerization of ethylene and propylene, ethylene and 1-butene, ethylene and hexene-1, ethylene and 4-methylpentene-1, ethylene and octene-1, and propylene and 1-butene, with satisfactory results.

The following examples are provided for a better understanding of the invention but are not intended to impose limitations on the invention.

INVENTIVE EXAMPLE I

Preparation of the Solid Catalyst Component 10 grams of commercially available anhydrous magnesium chloride, 1.9 grams of aluminum triethoxide and 0.7 gram of silicone tetrachloride were taken into a stainless steel pot of 400 ml containing 25 stainless steel balls of a half-inch diameter and subjected to ball milling for 5 hours at room temperature in a nitrogen atmosphere. Ball milling was continued for another 16 hours with addition of 2.1 grams of titanium tetrachloride. As a result, there was obtained a solid catalyst component containing 36 mg. of titanium per gram of solid powder.

Polymerization

A stainless steel autoclave of a 2-liter capacity equipped with an induction agitator was purged with nitrogen and then charged with 1,000 milliliters of hexane. 1 milli-mol of triethylalminum and 10 milligrams of the solid powder were added. While the batch was being agitated, the temperature was elevated to 90° C. Under the vapor pressure of hexane, the reaction system showed a pressure of 2 kg/cm$^2$.G. The system was charged with hydrogen to a total pressure of 5.6 kg/cm$^2$.G, and subsequently ethylene was charged to a total pressure of 10 kg/cm$^2$.G, whereupon the polymerization was initiated. The polymerization was continued for 3 hours with continuous charge of ethylene to make a total pressure of 10 kg/cm$^2$.G. After termination of the polymerization, the polymeric slurry was decanted into a beaker, and hexane was removed in vacuum, whereby there was obtained 226 grams white polyethylene having a melt index of 5.2 and a bulk density of 0.36. The catalytic activity was represented by 142,680 grams of polyethylene per gram titanium per hour per ethylene pressure, or 5,140 grams of polyethylene per gram solid per hour per ethylene pressure.

COMPARATIVE EXAMPLE I

The ball mill pot of Inventive Example I was charged with 10 grams anhydrous magnesium chloride, 2.1 grams aluminum triethoxide and 2.0 grams titanium tetrachloride. Ball milling of the admixture was effected for 16 hours in a nitrogen atmosphere at room temperature. The resulting catalyst component contained 35 mg. of titanium per gram solid powder. 10 grams of the solid powder were used to carry out polymerization for 1 hour in the same manner as described in Inventive Example I, whereby there was obtained 124 grams white polyethylene having a melt index of 4.0 and a bulk density of 0.30. Catalytic activity was represented by 80,500 grams polyethylene per gram titanium per hour per ethylene pressure, or 2,820 grams polyethylene per gram solid per hour per ethylene pressure.

COMPARATIVE EXAMPLE II

The ball mill pot of Inventive Example I was charged with 10 grams anhydrous magnesium chloride an 0.7 gram silicone tetrachloride. Ball milling of the admixture was effected for 5 hours in a nitrogen atmosphere at room temperature. 2.1 grams titanium tetrachloride was added and ball milling was continued for another 16 hours. The resulting catalyst component contained 42 mg. of titanium per gram solid powder. 10 grams of the solid powder were used to carry out polymerization for 1 hour in the same manner as described in Inventive Example I, whereby there was obtained 82 grams white polyethylene having a melt index of 4.9 and a bulk density of 0.22. Catalytic activity was represented by 44,400 grams polyethylene per gram titanium per hour per ethylene pressure, or 1,860 grams polyethylene per gram solid per hour per ethylene pressure.

INVENTIVE EXAMPLE II 10 grams of anhydrous magnesium chloride, 1.9 grams of aluminum triethoxide and 1.0 grams of monoethoxytrichlorosilane were taken into a stainless steel pot of the type described in Inventive Example I and subjected to ball milling for 5 hours at room temperature in a nitrogen atmosphere. Ball milling was continued for another 16 hours with addition of 2 grams of titanium tetrachloride. As a result, there was obtained a solid catalyst component containing 34 mg. of titanium per gram of solid powder. 10 mg. of the solid powder were used to carry out polymerization for 1 hour in the same manner as described in Inventive Example I, whereby there was obtained 208 grams white polyethylene having a melt index of 4.8 and a bulk density of 0.32. Catalytic activity was represented by 139,000 grams polyethylene per gram titanium per hour per ethylene pressure, or 4,730 grams polyethylene per gram solid per hour per ethylene pressure.

INVENTIVE EXAMPLE III 10 grams of anhydrous magnesium chloride, 2.2 grams of aluminum triethoxide and 1.1 gram of diphenoxydichlorosilane were taken into a stainless steel pot of the type described in Inventive Example I and subjected to ball milling for 5 hours at room temperature in a nitrogen atmosphere. Ball milling was continued for another 16 hours with addition of 2.1 grams of titanium tetrachloride. As a result, there was obtained a solid catalyst component containing 36 mg. of titanium per gram of solid powder. 10 mg. of the solid powder were used to carry out polymerization for 1 hour in the same manner as described in Inventive Example I, whereby there was obtained 240 grams white polyethylene having a melt index of 6.1 and a bulk density of 0.34. Catalytic activity was represented by 151,500 grams polyethylene per gram titanium per hour per ethylene pressure, or 5,450 grams polyethylene per gram solid per hour per ethylene pressure.

INVENTIVE EXAMPLE IV 10 grams of anhydrous magnesium chloride, 2.2 grams of aluminum triethoxide and 1 gram of triisopropoxymonochlorosilane were taken into a stainless steel pot of the type described in Inventive Example I and subjected to ball milling for 5 hours at room temperature in a nitrogen atmosphere. Ball milling was continued for another 16 hours with addition of 2.3 grams of titanium tetrachloride. As a result, there was obtained a solid catalyst component containing 38 mg. of titanium per gram of solid powder. 10 mg. of the solid powder used to carry out polymerization for 1 hour in the same manner as described in Inventive Example I, whereby there was obtained 183 grams white polyethylene having a melt index of 5.2 and a bulk density of 0.37. Catalytic activity was represented by 109,450 grams polyethylene per gram titanium per hour per ethylene pressure, or 4,160 grams polyethylene per gram solid per hour per ethylene pressure.

INVENTIVE EXAMPLE V 10 grams of anhydrous magnesium chloride, 1.8 grams of diethoxymonochloroaluminum and 1 gram of tetraethoxysilane were taken into a stainless steel pot of the type described in Inventive Example I and subjected to ball milling for 5 hours at room temperature in a nitrogen atmosphere. Ball milling was continued for another 16 hours with addition of 2 grams of titanium tetrachloride. As a result, there was obtained a solid catalyst component containing 34 mg. of titanium per gram of solid powder. 10 mg. of the solid powder were used to carry out polymerization for 1 hour in the same manner as described in Inventive Example I, whereby there was obtained 172 grams white polyethylene having a melt index of 6.5 and a bulk density of 0.35. Catalytic activity was represented by 115,000 grams polyethylene per gram titanium per hour per ethylene pressure, or 3,910 grams polyethylene per gram solid per hour per ethylene pressure.

INVENTIVE EXAMPLE VI

Preparation of the Solid Catalyst Component 10 grams of anhydrous magnesium chloride, 1.8 grams of aluminum triethoxide and 2 grams of diisopropoxydichlorotitanium were taken into a stainless steel pot of the type described in Inventive Example I and subjected to ball milling for 5 hours at room temperature in a nitrogen atmosphere. Ball milling was continued for another 16 hours with addition of 1.5 grams of diethoxydichlorosilane. As a result, there was obtained a solid catalyst component containing 27 mg. of titanium per gram of solid powder.

Polymerization

The solid catalyst component as above prepared was combined with triethylaluminum for effecting copolymerization of ethylene and butene-1 in a gas phase. This reaction was carried out in a stainless steel autoclave tied with a loop formed by a blower, a flow regulator and a dry cyclone, the autoclave being regulated in temperature with warm water circulated through its jacket. The autoclave held at 80° C. was charged with 250 mg/hr. of the solid powder and 50 m mol/hr. of triethylaluminum. The mol ratio of butene-1/ethylene was adjusted to be 0.27 and the feed of hydrogen to be 17% of the total pressure, all the gases being circulated by the blower through the system. The resulting ethylene copolymer showed a melt index of 1.1, a density of 0.921 and a particle size of the most part in the range of 250–500 microns. The yield was 225,400 grams per gram titanium. The molecular weight distribution by FR of the following definition was as narrow as 7.08.

$$FR = \frac{\text{melt index at 190° C. and at 10 kg load}}{\text{melt index at 190° C. and at 2.16 kg load}}$$

The copolymer was immersed in hexane at 68° C. for 5 hours, with only 1.5 weight percent extracted. After continuous operation over 10 hours, the autoclave was dismantled to reveal no traces of polymer deposited on the walls or on the agitator.

COMPARATIVE EXAMPLE III

Preparation of the Solid Catalyst Component 10 grams of anhydrous magnesium chloride, 1.8 grams of aluminum triethoxide and 2 grams of diisopropoxydichlorotitanium were taken into a stainless steel pot of the type described in Inventive Example I and subjected to ball milling for 16 hours at room temperature in a nitrogen atmosphere. As a result, there was obtained a solid catalyst component containing 31 mg. of titanium per gram of solid powder.

Polymerization

The procedure of Inventive Example VI was followed except for the use of the catalyst prepared as above, whereby there was obtained a white powdery copolymer having a melt index of 1.0, a density of 0.922 and a bulk density of 0.31. The yield was 183,000 grams per gram titanium. FR of the copolymer was 8.1. The copolymer extracts in hexane were 3.1 weight percent.

What is claimed is:

1. A process for the production of polyolefins which comprises homopolymerizing or copolymerizing α-olefins at a temperature in the range of about 20° to 120° C. under a pressure in the range of about atmospheric to 70 kg./cm.$^2$ and in the presence of a catalyst comprising a solid catalyst component and an organo-aluminum compound, said solid catalyst component resulting from the reaction of:

(a) a magnesium dihalide,
   (b) a compound represented by the formula:

$$Al(OR)_n X_{3-n}$$

where
   R is a hydrocarbon residual group having 1 to 20 carbon atoms,
   X is a halogen atom, and
   n is 1 to 3, (c) a compound represented by the general formula:

$$Si(OR')_m X_{4-m}$$

where
   R' is a hydrocarbon residual group have 1 to 20 carbon atoms,
   X is a halogen atom and
   m is 1 to 4, and (d) a titanium compound and/or a vanadium compound wherein:
   the mol ratio of magnesium dihalide (a) to compound (b) expressed as Mg/Al is in the range of 1/0.05–1/0.5,
   compound (c) is used in an amount of 0.1–50 grams per 100 grams of magnesium dihalide (a), and
   the titanium compound and/or vanadium compound (d) is used in an amount such that the resulting solid catalyst component contains 0.5–10 percent by weight of titanium and/or vanadium.

2. A process as defined in claim 1, wherein said compound (c) is used in an amount of 0.5–10 grams per 100 grams of said magnesium dihalide (a).

3. A process as defined in claim 1, wherein said titanium compound and/or vanadium compound is used in an amount such that the resulting solid catalyst component contains about 1 to 8 percent by weight of titanium and/or vanadium.

4. A process as defined in claim 1, wherein said magnesium dihalide is selected from the group consisting of magnesium fluoride, magnesium chloride, magnesium bromide, magnesium iodide and mixtures thereof.

5. A process as defined in claim 1, wherein said compound (b) is selected from the group consisting of aluminum trimethoxide, aluminum triethoxide, diethoxymonochloroaluminum, monoethoxydichloroaluminum, monomethoxidiethoxyaluminum, aluminum tri-n-propoxide, aluminum triisopropoxide, diisopropoxymonochloroaluminum, monoisopropoxydichloroaluminum, monomethoxydiisopropoxyaluminum, aluminum tri-n-butoxide, aluminum tri-sec-butoxide and aluminum tri-t-butoxide.

6. A process as defined in claim 1, wherein said compound (c) is selected from the group consisting of, monomethoxytrichlorosilane, monoethoxytrichlorosilane, monoisopropoxytrichlorosilane, mono-n-butoxytrichlorosilane, monopentoxytrichlorosilane, monoctoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane, and tetraisopropoxysilane.

7. A process as defined in claim 1, wherein said solid catalyst component is prepared by copulverizing the components (a), (b), (c) and (d).

8. The process as defined in claim 1 wherein said compound (d) is a trivalent or tetravalent titanium compound.

9. The process as defined in claim 1, wherein said compound (d) is a tetravalent titanium compound represented by the formula $Ti(OR)_nX_{4-n}$, wherein R is an alkyl, aryl or aralkyl group of 1 to 20 carbon atoms, X is a halogen atom and n has the value $0 \leq n \leq 4$.

10. The process as defined in claim 1, wherein said magnesium dihalide is $MgCl_2$.

11. The process according to claim 1 in which an α-olefin of 2 to 12 carbon atoms is homopolymerized, ethylene is copolymerized with an α-olefin containing 3 to 8 carbon atoms, or propylene is copolymerized with butene-1.

12. The process as defined in claim 1, wherein ethylene is homopolymerized or copolymerized with an α-olefin containing 3 to 8 carbon atoms.

13. The process as defined in claim 1, wherein ethylene is homopolymerized or copolymerized with butene-1.

14. The process as defined in claim 1, wherein said magnesium dihalide is $MgCl_2$ and wherein ethylene is homopolymerized or copolymerized with an α-olefin containing 3 to 8 carbon atoms.

15. The process as defined in claim 14 wherein said α-olefin is butene-1.

16. The process as defined in claim 1, wherein in said compound (b) of the formula $Al(OR)_nX_{3-n}$, R is an alkyl group of 1 to 4 carbon atoms;
said titanium compound (d) is a tetravalent titanium compound represented by the formula $Ti(OR)_mX_{4-m}$, wherein R is an alkyl, aryl or aralkyl group of 1 to 20 carbon atoms, X is a halogen atom and m has the value of $0 \leq m \leq 4$;
said compound (c) is used in an amount of 0.5 to 10 grams per 100 grams of said magnesium dihalide (a);
said tetravalent titanium compound is used in an amount such that the resulting solid catalyst component contains about 1 to 8 percent by weight of titanium, and
said solid catalyst component is prepared by copulverizing components (a), (b), (c) and (d) at a temperature which ranges from 0° C. to 200°C.

17. The process of claim 16 wherein said homopolymerization or copolymerization is carried out at a temperature of about 50° to 100° C. and a pressure of about 2 to 60 kg./cm.$^2$.

18. A process for the production of polyolefins which comprises homopolymerizing or copolymerizing α-olefins at a temperature of about 50° to 100° C. and a pressure of about 2 to 60 kg./cm.$^2$ and in the presence of a catalyst comprising a solid catalyst component and an organoaluminum compound, said solid catalyst resulting from reaction by copulverization of:
(a) magnesium dichloride
(b) a compound of the formula $Al(OR)_nX_{3-n}$ where
R is a hydrocarbon residual group having 1 to 20 carbon atoms
X is a halogen atom, and
n is 1 to 3
(c) a silane selected from the group consisting of monomethyoxytrichlorosilane, monoethoxytrichlorosilane, monoisopropoxytrichlorosilane, mono-n-butoxytrichlorosilane, monopentoxytrichlorosilane, monoctoxytrichlorosilane, monostearoxytrichlorosilane, monophenoxytrichlorosilane, mono-p-methylphenoxytrichlorosilane, dimethoxydichlorosilane, diethyloxydichlorosilane, diiosopropoxydichlorosilane, di-n-butoxydichlorosilane, dioctoxydichlorosilane, trimethoxymonochlorosilane, triethoxymonochlorosilane, triiosopropoxymonochlorosilane, tri-n-butoxymonochlorosilane, trisecbutoxymonochlorosilane, tetraethoxysilane, and tetraisopropoxysilane, and
(d) a tetravalent titanium compound wherein:
the mol ratio of magnesium dichloride to compound (b) expressed as Mg/Al is in the range of 1/0.05 to 1/0.5,
said compound (c) is used in an amount of about 0.5 to 50 grams per 100 grams of said magnesium chloride and
said tetravalent titanium compound is used in an amount such that the resulting solid catalyst component contains about 1 to 8 percent by weight of titanium.

19. The process of claim 18 wherein ethylene is homopolymerized or copolymerized with butene-1.

* * * * *